United States Patent
Lee et al.

(10) Patent No.: US 11,122,552 B2
(45) Date of Patent: Sep. 14, 2021

(54) DOWNLINK CONTROL SIGNALING SEGMENTATION

(71) Applicant: APPLE INC., Cupertino, CA (US)

(72) Inventors: Dae Won Lee, Portland, OR (US); Gang Xiong, Portland, OR (US); Hong He, Sunnyvale, CA (US); Seunghee Han, San Jose, CA (US)

(73) Assignee: APPLE INC., Cupertino, CA (US)

( * ) Notice: Subject to any disclaimer, the term of this patent is extended or adjusted under 35 U.S.C. 154(b) by 160 days.

(21) Appl. No.: 16/476,657

(22) PCT Filed: Jan. 31, 2018

(86) PCT No.: PCT/US2018/016302
§ 371 (c)(1),
(2) Date: Jul. 9, 2019

(87) PCT Pub. No.: WO2018/144641
PCT Pub. Date: Aug. 9, 2018

(65) Prior Publication Data
US 2021/0112528 A1 Apr. 15, 2021

Related U.S. Application Data

(60) Provisional application No. 62/455,441, filed on Feb. 6, 2017.

(51) Int. Cl.
*H04W 4/00* (2018.01)
*H04W 72/04* (2009.01)
*H04L 1/00* (2006.01)

(52) U.S. Cl.
CPC ........ *H04W 72/042* (2013.01); *H04L 1/0072* (2013.01)

(58) Field of Classification Search
None
See application file for complete search history.

(56) References Cited

U.S. PATENT DOCUMENTS

2007/0206709 A1* 9/2007 Khermosh ............. H04L 7/048
375/343
2011/0274074 A1* 11/2011 Lee ....................... H04L 5/0053
370/329
(Continued)

FOREIGN PATENT DOCUMENTS

KR 20130008781 A 1/2013

OTHER PUBLICATIONS

3GPP TSG-RAN WG1 NR AdHoc; R1-1700815; Title: 2-Stage DCI; Agenda item: 5.1.3.1; Source: Qualcomm Incorporated; Spokane, USA; Jan. 16-20, 2017.
(Continued)

*Primary Examiner* — Clemence S Han
(74) *Attorney, Agent, or Firm* — Stoel Rives LLP

(57) ABSTRACT

Technology for a Next Generation NodeB (gNB) operable to encode downlink control information (DCI) for transmission to a user equipment (UE) is disclosed. The gNB can identify DCI for transmission from the gNB. The gNB can determine that a size of the DCI exceeds a defined threshold. The gNB can divide the DCI into one or more DCI segments. Each DCI segment can include header information to enable the one or more DCI segments to be assembled at the UE. The gNB can encode the one or more DCI segments of the DCI for transmission from the gNB to the UE.

21 Claims, 15 Drawing Sheets

(56) References Cited

U.S. PATENT DOCUMENTS

| | | | | |
|---|---|---|---|---|
| 2014/0314036 A1* | 10/2014 | Takeda | ............... | H04L 5/0048 |
| | | | | 370/329 |
| 2015/0110031 A1* | 4/2015 | Takeda | ............... | H04L 5/0053 |
| | | | | 370/329 |
| 2015/0117353 A1* | 4/2015 | Takeda | ............... | H04W 72/042 |
| | | | | 370/329 |
| 2015/0181573 A1* | 6/2015 | Takeda | ............... | H04L 5/0048 |
| | | | | 370/329 |
| 2015/0229454 A1* | 8/2015 | Takeda | ............... | H04B 7/0452 |
| | | | | 370/329 |
| 2015/0282129 A1* | 10/2015 | Takeda | ............... | H04L 27/2643 |
| | | | | 370/329 |
| 2015/0295690 A1* | 10/2015 | Takeda | ............... | H04L 5/0094 |
| | | | | 370/329 |
| 2016/0044644 A1* | 2/2016 | Lyu | ............... | H04W 72/042 |
| | | | | 370/329 |
| 2018/0132272 A1* | 5/2018 | Sun | ............... | H04W 72/1289 |
| 2019/0081820 A1* | 3/2019 | Urabayashi | ......... | H04L 27/0006 |
| 2019/0182096 A1* | 6/2019 | Bin Sediq | ............ | H04L 1/0061 |

OTHER PUBLICATIONS

3GPP TSG-RAN WG1 NR AdHoc; R1-1701036; Title: Summary of e-mail discussions on downlink control signaling; Agenda: 5.1.3.1; Source: Ericsson; Spokane, USA; Jan. 16-20, 2017.

\* cited by examiner

FIG. 5

Segment #1 (out of 4)

| Bits | 3 | 2 | 2 | L-3-2-2 |
|---|---|---|---|---|
| | DCI Type (=110) | Sub Type (=10) | Segment ID (=00) | DCI Content |

Segment #4 (out of 4)

| Bits | 3 | 2 | 2 | L-3-2-2-M | |
|---|---|---|---|---|---|
| | DCI Type (=010) | Sub Type (=10) | Segment ID (=11) | DCI Content | CRC |

| DCI Types | | Subtypes | |
|---|---|---|---|
| Description | Value | Description | Value |
| DL Unicast | 00 | TxD Rank 1 | 000 |
| | | CL SM Single CW | 001 |
| | | OL SM Single CW | 010 |
| | | CL SM Multi-CW | 011 |
| | | JT CoMP | 100 |
| | | NAICS | 101 |
| | | Reserved | 110 |
| | | Reserved | 111 |
| DL Broadcast | 01 | - | N/A |
| UL | 10 | TxD Rank 1 | 00 |
| | | CL SM Wideband PMI | 01 |
| | | CL SM Subband PMI | 10 |
| | | Reserved | 11 |
| Reserved | 11 | - | N/A |

FIG. 8

DOWNLINK CONTROL SIGNALING SEGMENTATION

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates a downlink control information (DCI) segment in accordance with an example;

FIG. 8 is a table with downlink control information (DCI) types and DCI subtypes in accordance with an example;

Figure 1:
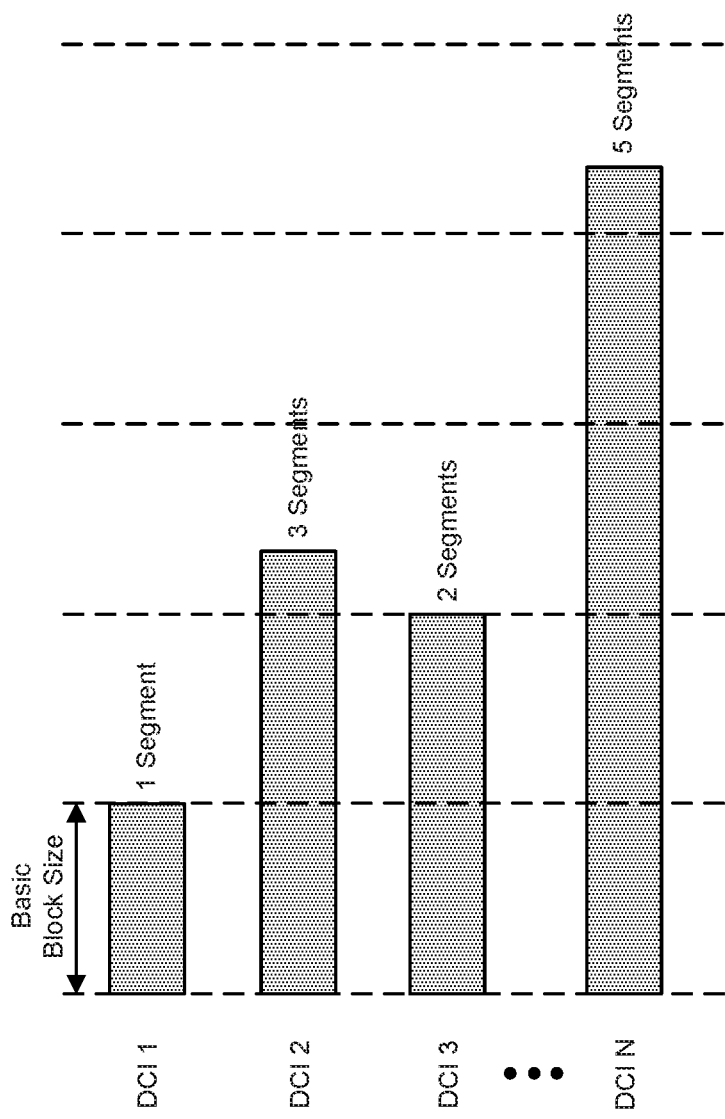
FIG. 1 illustrates downlink control information (DCI) that is divided into multiple DCI segments in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example, for downlink data transmissions, a receiver (e.g., a UE) can be informed via control signaling on a format on which data signals are modulated and transmitted from a transmitter (e.g., an eNodeB). From the control information, the UE can determine a payload size and a number of resources to be used for the data signals. In other words, the UE can use the control information to successfully decode the data. For data signals, the control information is explicitly communicated to the UE.

On the other hand, for control signaling, there is no explicit control information that is previously communicated to the UE. The control signaling is the first signaling that the UE decodes in order to receive data. In order to reduce the UE complexity involved in receiving the control information, the payload size and format can be restricted in terms of transmission and reception, such that only a certain number of formats (with a given payload size and number of resource elements) can be used. In other words, the number of formats that are available in which the UE can blindly check for is limited by the 3GPP LTE specification. Since the UE does not actually know whether control signaling is sent or not, the UE can perform blind detection of these control signals.

In one example, the 3GPP LTE specification mandates the UE to perform blind detection of two different payload sizes using four different types of control information resources, which are referred to as aggregation levels. A control resource can be sent using a control channel element (CCE), which are resources used by the control information. A transmission can be mapped over a single CCE, 2 CCEs, 4 CCEs, 8 CCEs or 16 CCEs. In addition, there can be two different types of payload sizes for transmitting the control information. Thus, the UE can perform a blind search of a combination of payload size and the CCE aggregation levels. This design is beneficial in terms of UE complexity, as the UE only has a limited set of blind decodes to perform to receive the control information. On the other hand, this design is limiting as the control information has to exactly fit the payload size. When introducing a new payload size that was not previously supported, the UE will perform an additional blind decode for the new payload size.

In one example, different control signaling can be necessitated to support a new transmission scheme that is added to subsequent cellular communication systems. If the payload size of a new control signaling format is different from what the UE has previously supported, the UE will perform additional blind detection of such control signal formats, which can increase UE complexity and power consumption for receiving control signals.

In the present technology, control signals can be transmitted that vary in payload size, while the UE does not perform additional blind decodes associated with different payload sizes. For example, the eNodeB can perform a segmentation of the control information into modular blocks, and the eNodeB can then transmit these modular blocks (i.e., the segmented control information). Each modular block can be transmitted using different control channel resources. The UE can receive the modular blocks, and then combine these modular blocks back together to form single control information. In other words, the UE can decode the segmented blocks and piece the segmented blocks back together to obtain the original DCI signaling. To enable this segmentation, the eNodeB can transmit the modular blocks with control signaling header information, which can enable the UE to piece together the modular blocks, decipher DCI content, distinguish one DCI content from another, etc. The UE can use the header information to distinguish between DCI formats and content. In the present technology, with the novel technique of segmenting the DCI into modular blocks, the total number of blind decodes at the UE can remain constant, while enabling the UE to support a wide range of control signal payload sizes. In other words, with the present technology, a wide variety of DCI formats can be supported at the UE without increasing the number of blind decoding attempts at the UE.

In one example, an LTE UE can receive downlink control signals by performing blind detection, i.e., multiple hypotheses, of downlink control signals among control resource candidates. The resource candidates can be referred to as a control signal search space. Since the detection of the downlink control can be based on decoding trial and error, the UE can perform multiple decoding attempts for different downlink control signal payload sizes. Future evolution of transmission techniques for New Radio (NR) wireless communication systems can necessitate support of additional bits in the downlink control signaling. At the same time, when the UE detects different downlink control signaling payloads simultaneously, this can be a large complexity burden for UEs. Thus, NR wireless communication systems can support a control channel with one of the following design philosophies: (1) support multiple blind decodes (per control resource), and limit the number of blind decodes by configuring a limited set of control channel payloads to monitor; (2) support one (or limited) blind decodes (per control resource), and provide extra reserved bits for future use; or (3) support one blind decodes, and support modular control channel with segmentation.

In one configuration, downlink control information (DCI) can be divided into multiple DCI segments at a base station when a DCI size exceeds a defined threshold. The base station can divide the DCI into multiple DCI segments or DCI blocks, where each DCI segment is a fixed payload size, which can be denoted as a basic block size. The DCI segments that are created at the base station can be of modular block sizes. The base station can transmit the DCI segments in units of the basic block size. Thus, when the size of the DCI exceeds the basic block size, the base station can break the DCI into multiple DCI segments. The base station can transmit the multiple DCI segments separately. The multiple DCI segments can be separately transmitted from the base station in a same subframe. At a receiver (e.g., the UE), the DCI segments can be decoded with an assumption of the basic block size. The UE can piece together successfully decoded DCI segments to obtain the original DCI. Thus, the UE can decode these DCI segments individually and combine the decoded DCI segments together to obtain the original DCI.

FIG. 1 illustrates an example of downlink control information (DCI) that is divided into multiple DCI segments. For example, DCI can be divided into DCI segments that are of a basic block size. In other words, the DCI can be broken apart into units of these basic block sizes, which are modular block sizes. As a result, the DCI can be modular and can incorporate size changes that occur in the future.

In one example, when a DCI size fits within a basic block size, the base station can transmit the DCI using a single basic block size. In another example, when a DCI size is less than a basic block size, the base station can apply padding such that the DCI and the padding are exactly equal to the basic block size, and the base station can transmit the DCI and padding that are equal to the basic block size. In yet another example, when the DCI size is more than the basic block size, the base station can perform a segmentation and split the DCI into multiple DCI segments that are each equal to the basic block size, and the base station can transmit the multiple DCI segments.

In the example shown in FIG. 1, there can be multiple DCIs of various sizes, such as DCI 1, DCI 2, DCI 3 and DCI N, where N is an integer. In this example, there can be N different DCI formats. As shown, a size of DCI 1 can be equal to one basic block size, so DCI 1 can be transmitted in one segment. A size of DCI 2 can be more than two basic block sizes and less than three basic block sizes, so DCI 2 can be transmitted in two segments. A size of DCI 3 can be equal to two basic block sizes, so DCI 3 can be transmitted in two segments. In addition, a size of DCI N can be more than four basic block sizes and less than five basic block sizes, so DCI N can be transmitted in five segments In one configuration, original DCI (e.g., DCI with a size that exceeds that of a basic control block) can be broken into a series of DCI segments, and the series of DCI segments can be individually transmitted from the base station. When the UE combines these DCI segments are decoding the DCI segments individually, the UE can determine whether or not the decoded DCI information is correct. The UE can determine the integrity of the DCI information based on a cyclic redundancy check (CRC) transmission from the base station. The CRC can be parity information that is transmitted as an overhead that enables the UE to check the integrity of the decoded DCI information.

In one example, the CRC may not be repeated in every DCI segment transmission. In other words, the CRC may not be included in every DCI segment. Rather, the base station can embed the CRC information in a last DCI segment out of a group of DCI segments (that corresponds to a complete DCI), or in one of the DCI segments in a multi-segment transmission. The CRC in the last DCI segment can protect the content in all of the DCI segments in the group of DCI segments. In other words, when the UE checks for the CRC, the UE can check the integrity of all of the DCI segments that correspond to the complete DCI. Although the different DCI segments can be transmitted individually in separate resource locations, the UE can concatenate all of the different DCI segments together, and then compute the CRC across the entire DCI transmission. In other words, the UE can decode the DCI segments individually, and then perform a single CRC computation across all of the received DCI segments.

Figure 2:
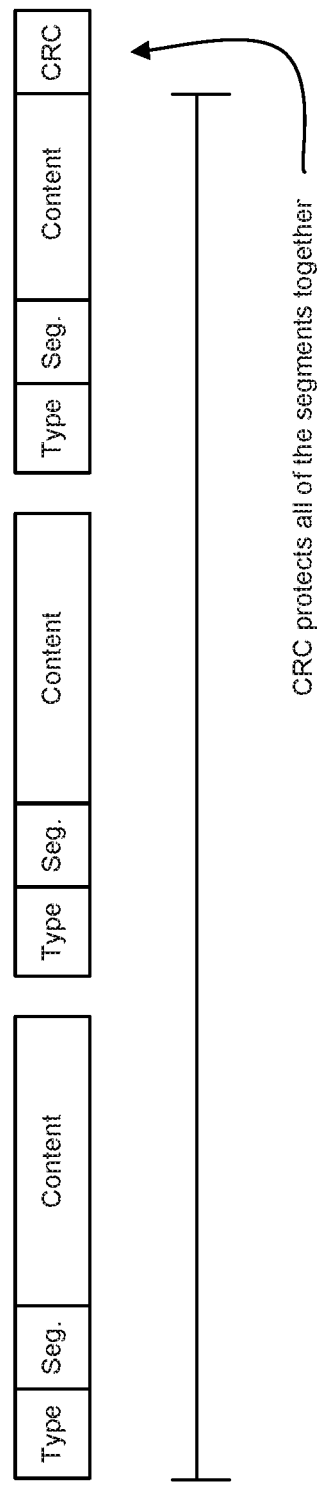
FIG. 2 illustrates a series of downlink control information (DCI) segments in which one DCI segment in the series includes a cyclic redundancy check (CRC) sequence in accordance with an example.

FIG. 2 illustrates an example of a series of downlink control information (DCI) segments in which one DCI segment in the series includes a cyclic redundancy check (CRC) sequence. For example, the DCI can be divided into multiple DCI segments. Each DCI segment can include header information and DCI content. The header information can uniquely identify how the content is to be deciphered at the UE (or receiver). The header information can include a DCI type field to identify a DCI type and/or DCI format of the DCI. Depending on the type of DCI to be transmitted, the eNodeB (or transmitter) can determine to populate the header with a particular DCI type field that is understood by the UE. The header information can also include a segment identifier (ID) or segmentation index, which can uniquely identify an ordering when there are multiple DCI segments. The header information, which can include the DCI type field and the segment ID, can be used by the UE to decipher the DCI segments and piece the DCI segments together to form the original DCI. In addition, a last DCI segment of the DCI can include the CRC sequence, which can be used by the UE to verify a correct reception of the DCI. In other words, the CRC sequence in the last DCI segment can collectively protect all of the DCI segments that are associated with a single DCI.

Figure 3:
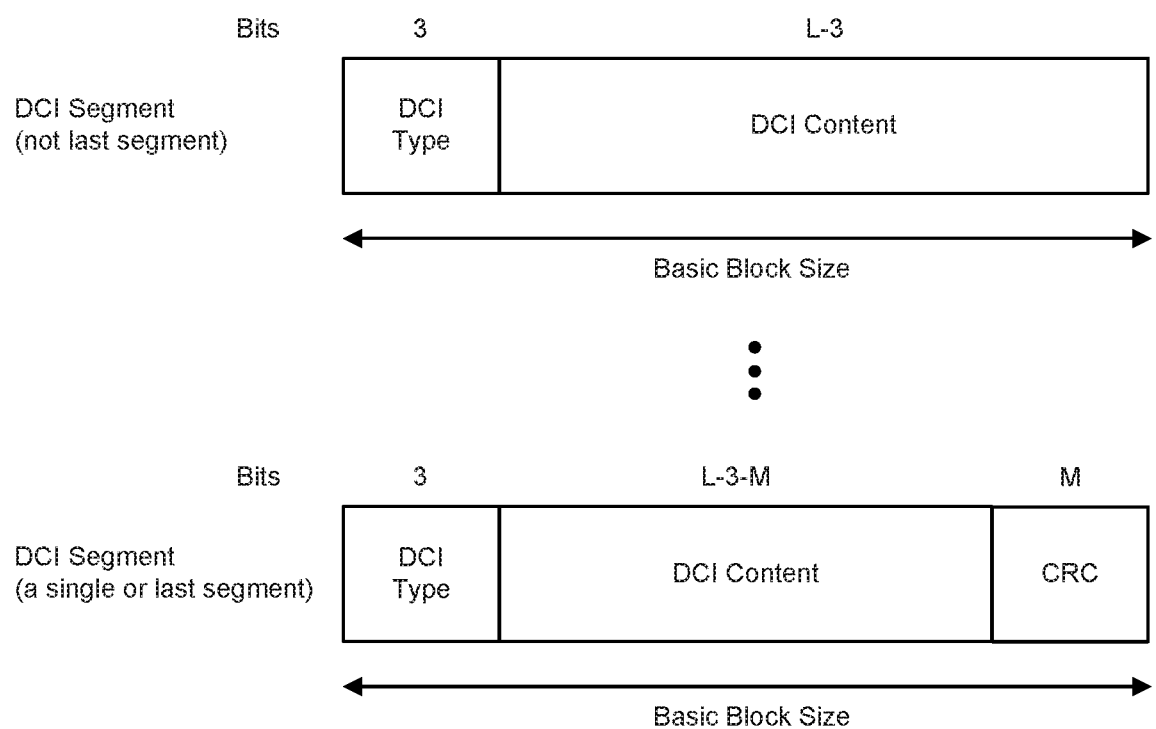
FIG. 3 illustrates a downlink control information (DCI) segment in accordance with an example.

FIG. 3 illustrates examples of downlink control information (DCI) segments. Depending on whether a DCI segment is a last DCI segment in a series of DCI segments or the only DCI segment (i.e., a size of the DCI is small enough to fit into a single DCI segment), a CRC sequence can be included in the DCI segment. The CRC sequence can be used at the UE to perform a DCI content integrity check. The CRC sequence can be inserted by the eNodeB in the last DCI segment, or alternatively, when there are no multiple DCI segments (i.e., a single DCI segment), the CRC sequence can be included in that DCI segment.

In a first example, as shown in FIG. 3, a DCI segment is not a last DCI segment in a series of DCI segments. A size of the DCI segment can be equal to that of a basic control block. The DCI segment can include header information, which can include a DCI type field to identify a DCI type and/or DCI format of the DCI. The DCI segment can include DCI content. As an example, the DCI type field can be 3 bits and the DCI content can be L-3 bits, where L is an integer.

In a second example, as shown in FIG. 3, a DCI segment can be a single segment (i.e., a size of the DCI is small enough to fit into a single DCI segment) or the DCI segment can be a last DCI segment in a series of DCI segments. A size of the DCI segment can be equal to that of a basic control block. The DCI segment can include header information, which can include a DCI type field to identify a DCI type and/or DCI format of the DCI. The DCI segment can include DCI content. In addition, since this DCI segment is the only segment or is the last DCI segment, the DCI segment can include a CRC sequence. As an example, the DCI type field can be 3 bits, the CRC sequence can be M bits, and the DCI content can be L-3-M bits, where L and M are integers.

Figure 4:
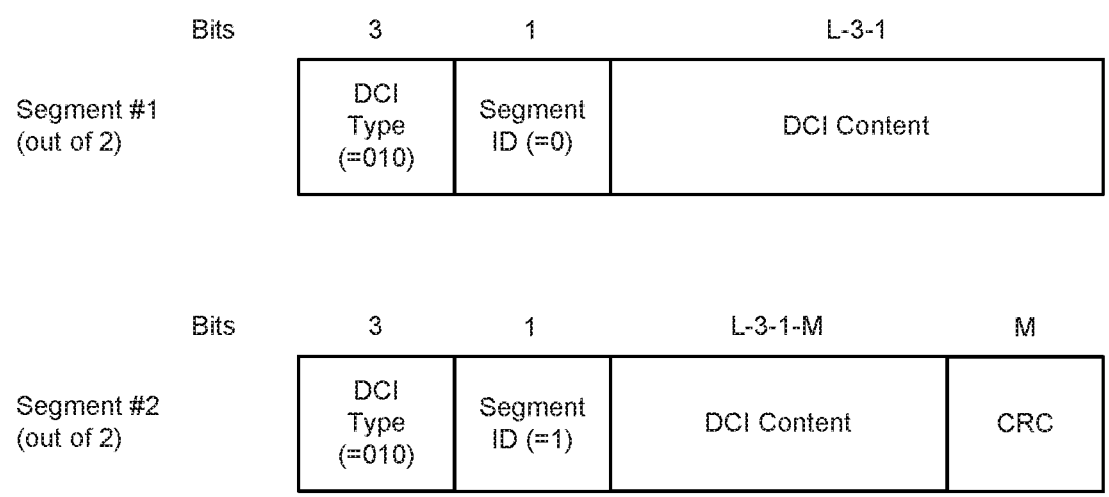
FIG. 4 illustrates a downlink control information (DCI) segment in accordance with an example.

FIG. 4 illustrates examples of downlink control information (DCI) segments. Each DCI segment can include header information. The header information can include a DCI type field that indicates that this particular DCI format has X segments (e.g., two segments), where X is an integer. The header information can also include a segment ID that uniquely identifies an ordering of DCI segments (when there are multiple DCI segments that form DCI). The segment ID can indicate which DCI segment corresponds to a decoded DCI block. For example, if there are two DCI segments, there can be segment ID information in the header of each DCI segment that indicates which DCI segment is the first DCI segment and which DCI segment is the second DCI segment. Based on this information, the UE can identify a last DCI segment, which can include a CRC sequence. The last DCI segment can include the CRC sequence to protect the integrity of the two DCI segments.

As shown in the example in FIG. 4, DCI can be divided into one or more DCI segments, such as segment #1 and segment #2. The first DCI segment can include header information and DCI content, where the header information includes a DCI type field and a segment ID. In this example, the DCI type field can be 3 bits, the segment ID can be one bit, and the DCI content can be L-3-1 bits, where L is an integer. In this example, the DCI type field can include a value of '101' and the segment ID can include a value of '0'. The second DCI segment can include header information, DCI content and a CRC sequence, where the header information includes a DCI type field and a segment ID. In this example, the DCI type field can be 3 bits, the segment ID can be one bit, the CRC sequence can be M bits, and the DCI content can be L-3-1-M bits, where L and M are integers. In this example, the DCI type field can include a value of '010' and the segment ID can include a value of '1'.

FIG. 5 illustrates examples of downlink control information (DCI) segments. Each DCI segment can include header information. The header information can include a DCI type field, a segment ID and a DCI subtype field. The DCI subtype field can identify a DCI subtype and/or DCI subformat of the DCI. The DCI subtype field can provide more granular information as compared to the DCI type field. Based on the header information, a UE can uniquely identify DCI content and possibly segment number information (when there are multiple DCI segments).

As shown in the example in FIG. 5, DCI can be divided into four DCI segments, such as segment #1, segment #2, segment #3 and segment #4. The first DCI segment can include header information and DCI content, where the header information includes a DCI type field, a DCI subtype field and a segment ID. In this example, the DCI type field can be 3 bits, the DCI subtype field can be 2 bits, the segment ID can be two bits, and the DCI content can be L-3-2-2 bits, where L is an integer. In this example, the DCI type field can include a value of '110', the DCI subtype field can include a value of '10', and the segment ID can include a value of '00'. The fourth DCI segment can include header information, DCI content and a CRC sequence, where the header information includes a DCI type field, a DCI subtype field and a segment ID. In this example, the DCI type field can be 3 bits, the DCI subtype field can be 2 bits, the segment ID can be two bits, the CRC sequence can be M bits, and the DCI content can be L-3-2-2-M bits, where L and M are integer. In this example, the DCI type field can include a value of '010', the DCI subtype field can include a value of '10', and the segment ID can include a value of '11'.

In the example shown in FIG. 5, a DCI format can be divided into four DCI segments or blocks. The DCI type field and the DCI subtype field can indicate that this is a DCI format that has four DCI segments. The segment IDs can indicate which DCI segments correspond to decoded DCI blocks. In addition, the last DCI segment can include the CRC sequence to protect the integrity of the four DCI segments.

In one configuration, the UE (or receiver) can decode DCI segments received from the eNodeB (or transmitter), and the UE can piece together the DCI segments to form an original DCI (or complete DCI). The UE can attempt to decode the DCI in units of control channel elements (CCEs) in a logical CCE space. The UE can be assigned to particular resources, and from these resources, the UE can piece together DCI segments that correspond to the logical CCEs. The UE can decode a series of DCI segments individually. For example, the eNodeB can transmit a DCI format that is broken into two DCI segments. The two DCI segments can be transmitted within this logical CCE space. Thus, the UE can decode each of these DCI segments separately, and using the header information included in the DCI segments, the UE can determine whether a DCI segment is a first DCI segment of the DCI or a second DCI segment of the DCI, or so on.

In one example, after decoding the received DCI segments, the UE does not actually know whether the decoded information is correct or not. In other words, at this point, the UE does not yet check for the CRC. Rather, the UE can look at the header information of the DCI segments and determine whether there is a decoded DCI block that corresponds to a first DCI segment. The UE can also determine whether there is a decoded DCI block that corresponds to a second DCI segment (or a same DCI type), and so on. If the UE finds multiple candidates, the UE can perform CRC for all of these different combinations to finally find a right combination that corresponds to correct DCI content. As a result, the CRC can be used to check the integrity of decoded information in case there are multiple false alarms in the decoding process.

In one example, the UE can piece together decoded DCI segments into an original DCI by searching for DCI segments with a same DCI type ID. The segment ID can be inserted in the DCI segments to identify how to piece together the DCI segments. The UE can perform a decoding of each of the CCE candidates. The UE can read the contents of each DCI segment but cannot verify the DCI segments, as each DCI segment does not contain an individual CRC. The UE can attempt to find DCI segments that have the same DCI type ID. The UE can order these DCI segments based on the segment ID, and the UE can perform a CRC computation using a CRC sequence that is included in a last DCI segment. When there are falsely detected DCI segments, the UE can perform multiple CRC computations with multiple hypotheses to identify correctly received DCI segments.

Figure 6:
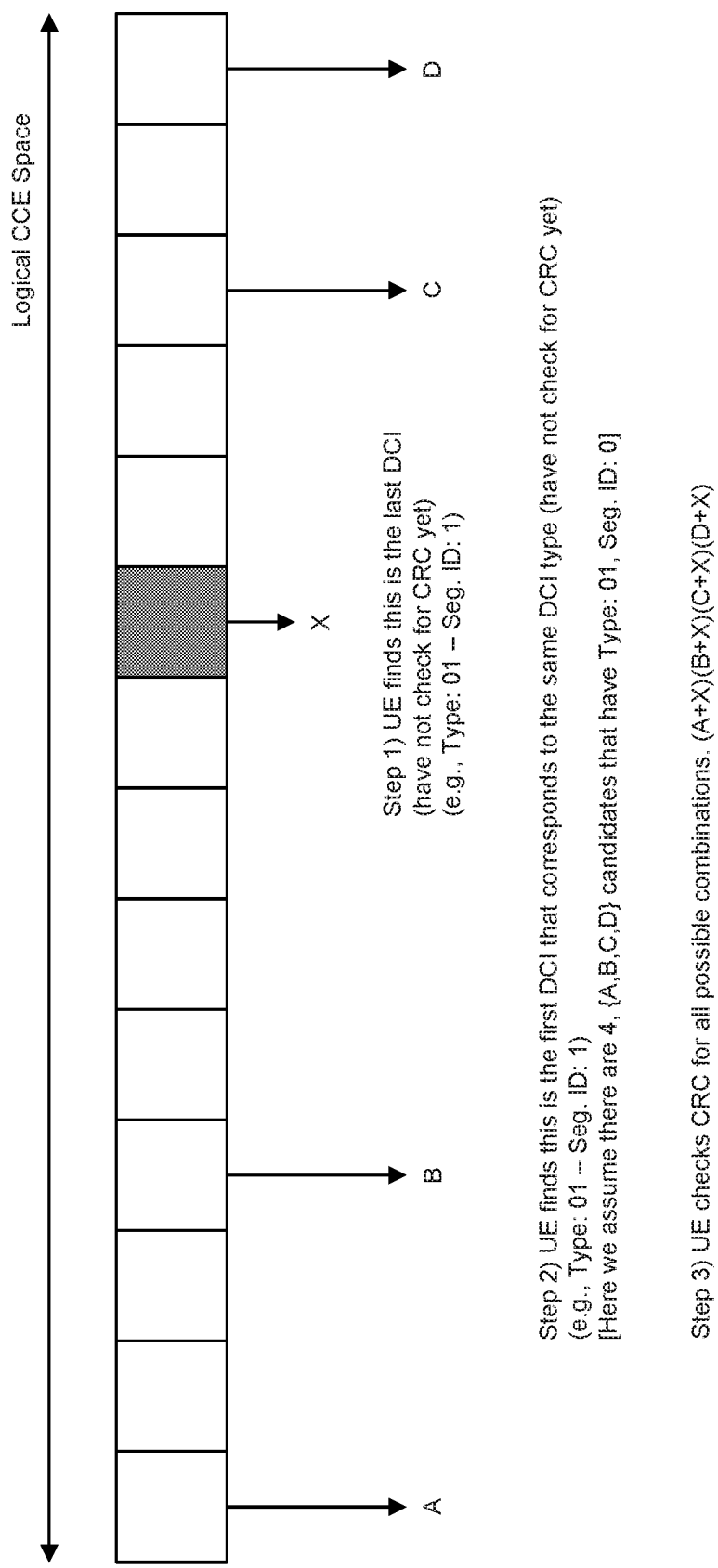
FIG. 6 illustrates separate downlink control information (DCI) segments for combining at a receiver in accordance with an example.

FIG. 6 illustrates an example of separate downlink control information (DCI) segments that are combined at a UE (or receiver). In a first action, the UE can identify that DCI segment X is a last DCI segment. At this point, the UE does not yet perform a CRC computation. In this example, the DCI segment X can have a DCI type of '01' and a segment ID of '1'. In a second action, the UE can identify that DCI segment A is a first DCI that corresponds to the same DCI type as DCI segment X. At this point, the UE does not yet perform a CRC computation. In this example, the DCI segment A can have a DCI type of '01' (same as DCI segment X) and a segment ID of '0'. In addition, the UE can also identify DCI segment B, DCI segment C and DCI segment D as having the same DCI type as DCI segment X. In other words, in this example, there are four candidates (DCI segments A, B, C and D) that all have a DCI type of '01' and a segment ID of '0'. In a third action, the UE can perform a CRC computation for all possible combinations (e.g., DCI segments A and X, DCI segments B and X, DCI segments C and X and DCI segments D and X) to identify correctly received DCI segments.

In one example, the CRC can be completed after all of the individual DCI segments are received at the UE. If the DCI is segmented into multiple pieces, the CRC can only be checked when the UE successfully decodes all of the DCI segments. In one example, it can be desirable for the UE to reduce the number of false detections. For example, the UE can detect block A, and based on header information included in block A, the UE can determine that block A belongs to a first DCI segment and that block A does not contain a CRC sequence. At this point, the UE does not know whether block A is a falsely detected information block or whether block A is correctly decoded. Rather, the UE will identify a second DCI segment and perform a CRC computation to determine whether or not block A is correct. When the UE finds multiple candidates that all correspond to a first DCI segment in the decoding process due to errors (or by chance), the UE will perform CRC computations for all of the combinations. For example, if blocks A, B, C and D all correspond to a first DCI segment, and block X corresponds to a second DCI segment, then the UE can perform a CRC computation for the combination of A and X as a single DCI format, the combination of B and X as a single DCI format, and so on. In this case, the UE can perform the CRC a total of four times before determining which received DCI segments are correct.

In one configuration, the number of combinations for which the UE performs the CRC computations can be reduced by including header parity information in the DCI segments. For example, a header parity check field can be included in the DCI to improve the number of false detections. The header parity information can protect only the header information or a first few bits of the DCI. Rather than inserting a full-fledged 24-bit CRC sequence in a last segment of the DCI, one or two bits of header parity information can be included in each DCI segment, and this header parity information can be used to check the integrity of the header portion in the DCI segment. In one example, the header parity information can provide a parity check of a fixed bit width that contains potential header information for the DCI segment. The addition of the header parity information in the DCI segments can reduce the number of CRC computations that are performed at the UE. While the addition of the header parity information can slightly reduce overhead, this option can result in less complex operation at the UE. In addition, the inclusion of the header parity information in the DCI can improve the number of false detections and protect the subtype field detection. In other words, the inclusion of the header parity information in the DCI can reduce the number of DCI type and DCI subtype combination CRC computations.

Figure 7:
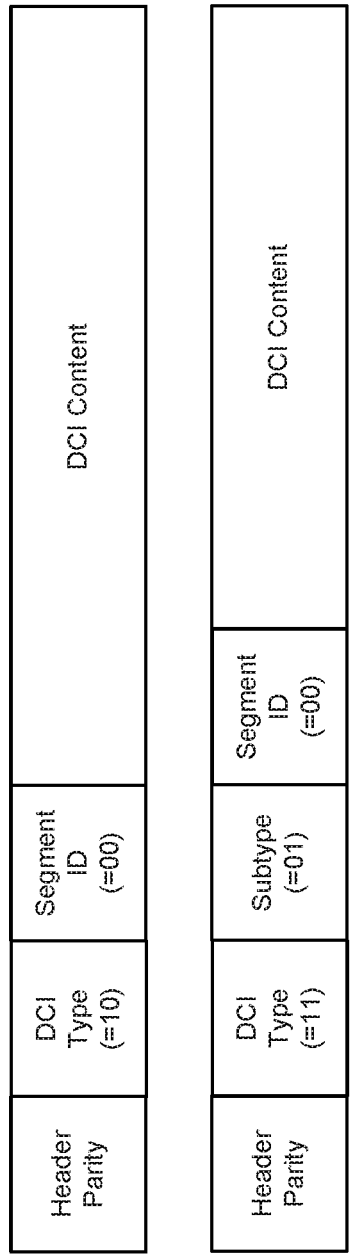
FIG. 7 illustrates a downlink control information (DCI) segment that includes a header parity check field in accordance with an example.

FIG. 7 illustrates examples of downlink control information (DCI) segments that include a header parity check field. As an example, a first DCI segment can include a header parity check field, a DCI type field (e.g., '10'), a segment ID (e.g., '0') and DCI content. As another example, a second DCI segment can include a header parity check field, a DCI type field (e.g., '11'), a DCI subtype field (e.g., '01'), a segment ID (e.g., '0') and DCI content. In both examples of the DCI segments, the header parity check field can serve to protect header information (i.e., the DCI type field, the DCI subtype field, and the segment ID) and reduce the number of false detections.

FIG. 8 is an exemplary table with downlink control information (DCI) types and related DCI subtypes. The DCI types can include: DL unicast with a value of '00', DL broadcast with a value of '01', UL with a value of '10' and reserved with a value of '11'. With respect to the DCI type of DL unicast, the corresponding DCI subtypes can include: TxD rank 1 with a value of '000', closed loop (CL) spatial multiplexing (SM) single code word (CW) with a value of '001', open loop (OL) SM single CW with a value of '010', CL SM multi-CW with a value of '011', joint transmission (JT) coordinated multipoint (CoMP) with a value of '100', network assisted interference cancellation and suppression (NAICS) with a value of '101', reserved with a value of '110' and reserved with a value of '111'. With respect to the DCI type of UL, the corresponding DCI subtypes can include: TxD rank 1 with a value of '00', CL SM wideband precoding matrix indicator (PMI) with a value of '01', CL SM subband PMI with a value of '10' and reserved with a value of '11'.

In one example, a network element can perform a segmentation of control signals into a plurality of blocks, where a size of the plurality of blocks is from a supported control signal payload size at the UE. In another example, a last segment block of the control signal can carry cyclic redundancy check parity bits that protect the entire control signal. In another example, a segment block carry type field indication can indicate a bit field format of the control signal. In a further example, a segment block can carry segment identification that indicates a segment number of the segmented block.

Figure 9:
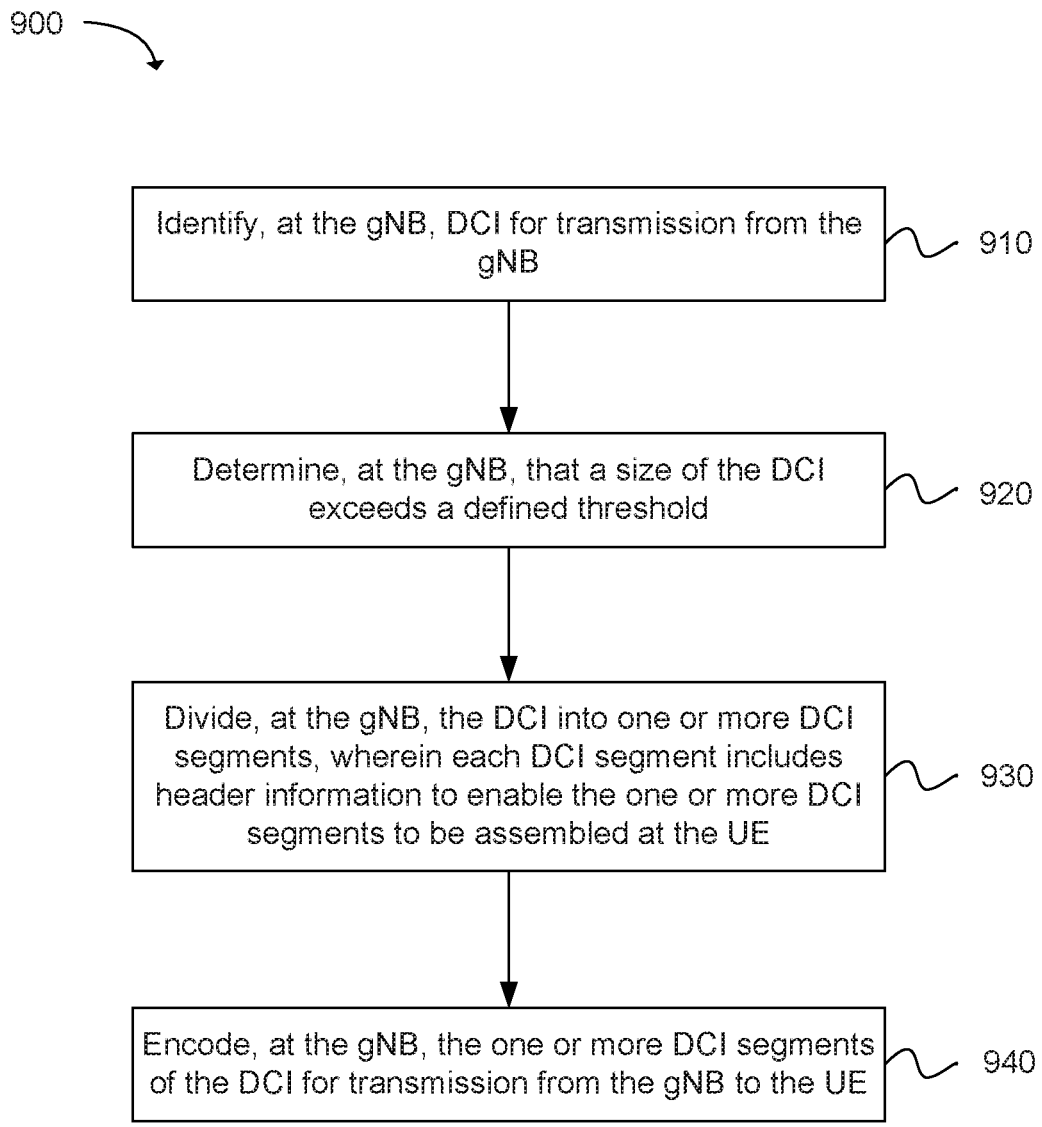
FIG. 9 depicts functionality of a Next Generation NodeB (gNB) operable to encode downlink control information (DCI) for transmission to a user equipment (UE) in accordance with an example.

Another example provides functionality 900 of a Next Generation NodeB (gNB) operable to encode downlink control information (DCI) for transmission to a user equipment (UE), as shown in FIG. 9. The gNB can comprise one or more processors configured to identify, at the gNB, DCI for transmission from the gNB, as in block 910. The gNB can comprise one or more processors configured to determine, at the gNB, that a size of the DCI exceeds a defined threshold, as in block 920. The gNB can comprise one or more processors configured to divide, at the gNB, the DCI into one or more DCI segments, wherein each DCI segment includes header information to enable the one or more DCI segments to be assembled at the UE, as in block 930. The gNB can comprise one or more processors configured to encode, at the gNB, the one or more DCI segments of the DCI for transmission from the gNB to the UE, as in block 940. In addition, the gNB can comprise a memory interface configured to retrieve from a memory the DCI.

Figure 10:
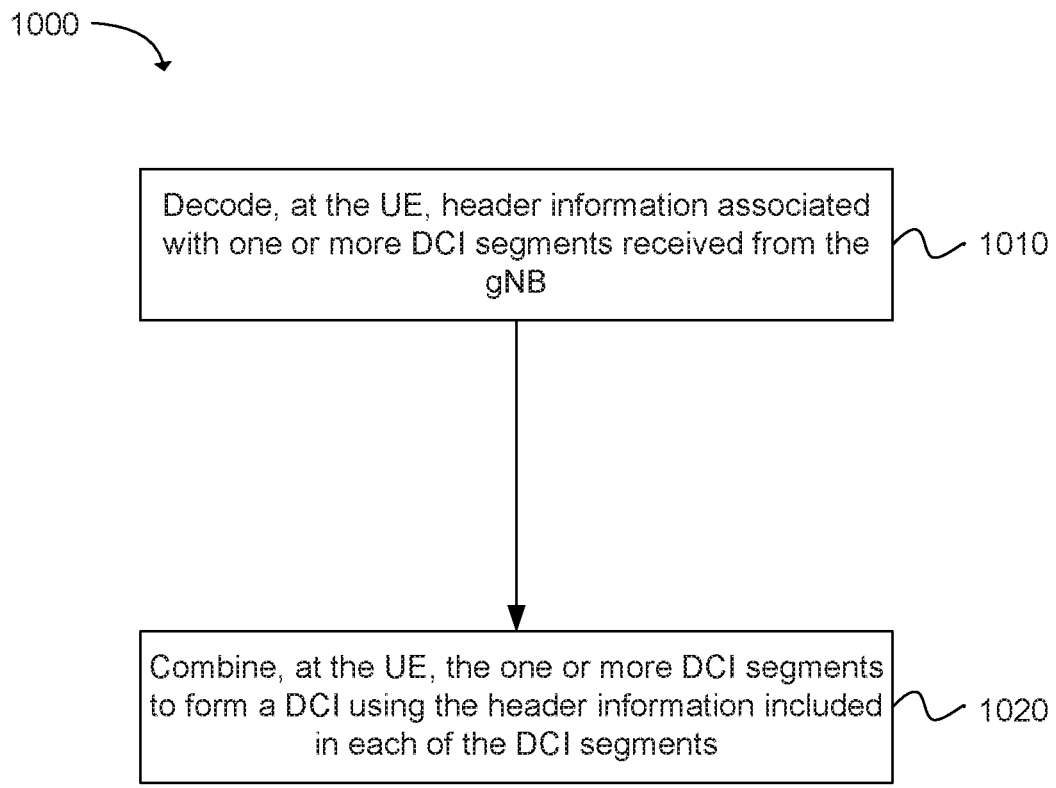
FIG. 10 depicts functionality of a user equipment (UE) operable to decode downlink control information (DCI) received from a Next Generation NodeB (gNB) in accordance with an example.

Another example provides functionality 1000 of a user equipment (UE) operable to decode downlink control information (DCI) received from a Next Generation NodeB (gNB), as shown in FIG. 10. The UE can comprise one or more processors configured to decode, at the UE, header information associated with one or more DCI segments received from the gNB, as in block 1010. The UE can comprise one or more processors configured to combine, at the UE, the one or more DCI segments to form a DCI using the header information included in each of the DCI segments, as in block 1020. In addition, the UE can comprise a memory interface configured to send to a memory the DCI.

Figure 11:
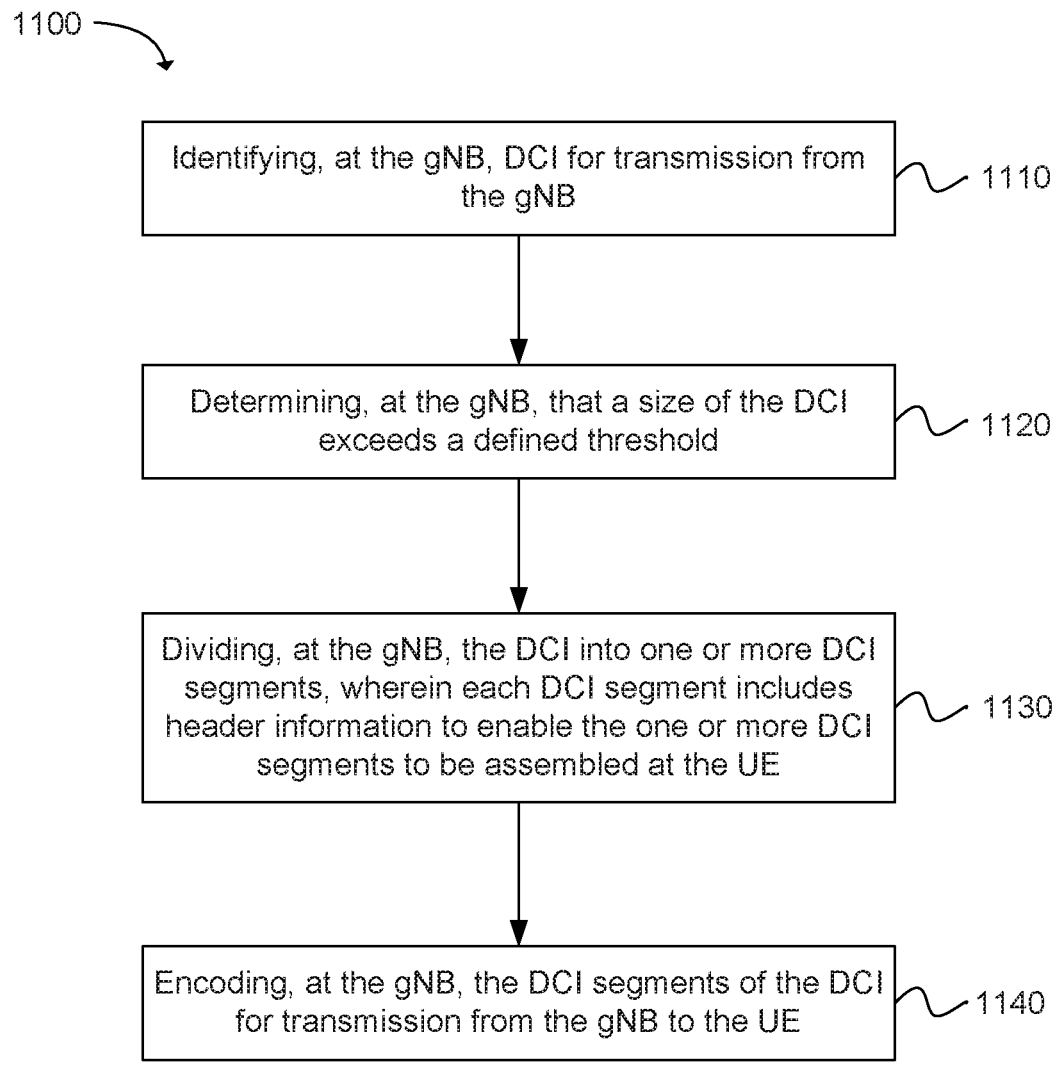
FIG. 11 depicts a flowchart of a machine readable storage medium having instructions embodied thereon for encoding downlink control information (DCI) for transmission from a Next Generation NodeB (gNB) to a user equipment (UE) in accordance with an example.

Another example provides at least one machine readable storage medium having instructions 1100 embodied thereon for encoding downlink control information (DCI) for transmission from a Next Generation NodeB (gNB) to a user equipment (UE), as shown in FIG. 11. The instructions can be executed on a machine, where the instructions are included on at least one computer readable medium or one non-transitory machine readable storage medium. The instructions when executed by one or more processors of the gNB perform: identifying, at the gNB, DCI for transmission from the gNB, as in block 1110. The instructions when executed by one or more processors of the gNB perform: determining, at the gNB, that a size of the DCI exceeds a defined threshold, as in block 1120. The instructions when executed by one or more processors of the gNB perform: dividing, at the gNB, the DCI into one or more DCI segments, wherein each DCI segment includes header information to enable the one or more DCI segments to be assembled at the UE, as in block 1130. The instructions when executed by one or more processors of the gNB perform: encoding, at the gNB, the DCI segments of the DCI for transmission from the gNB to the UE, as in block 1140.

Figure 12:
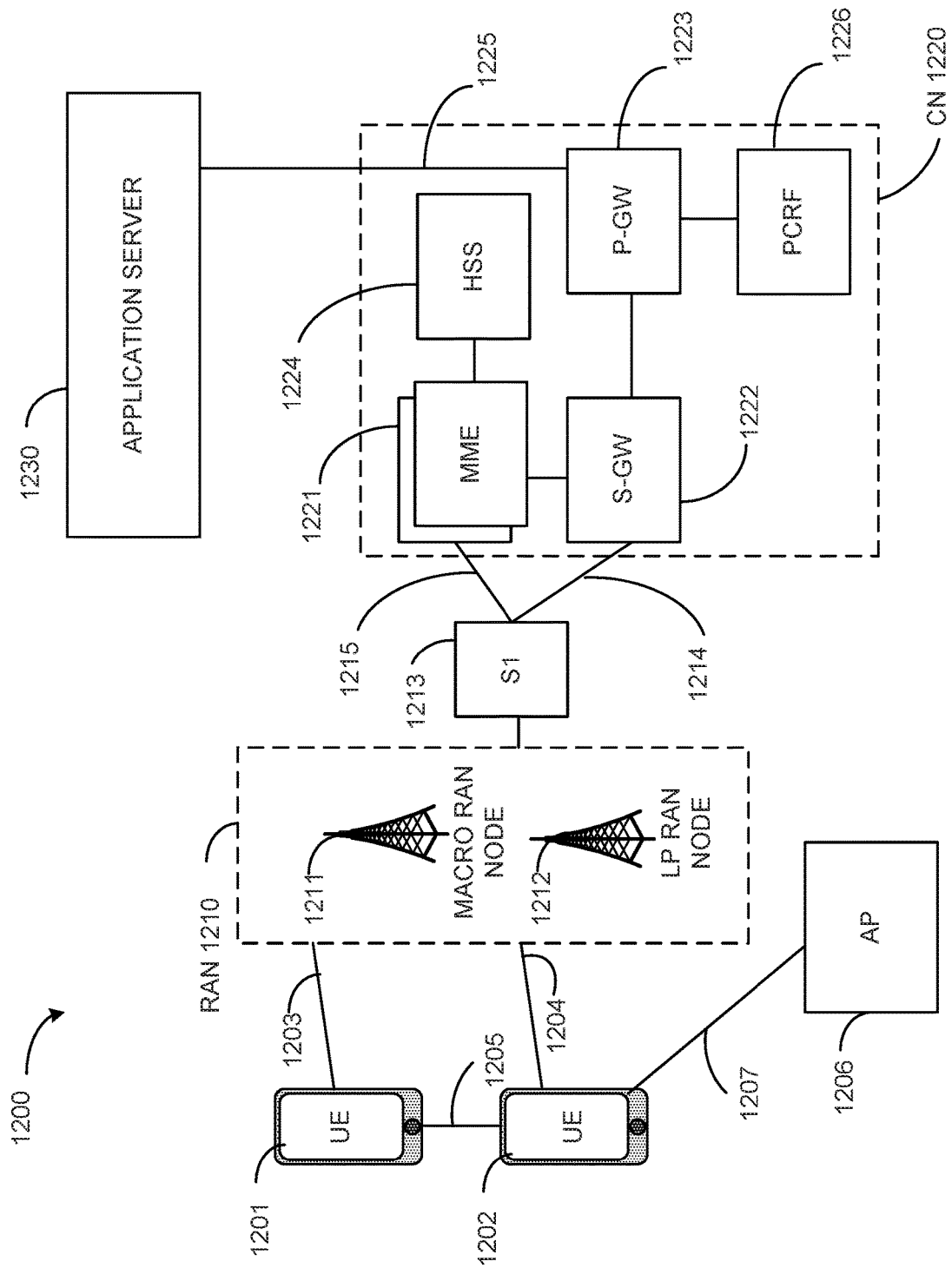
FIG. 12 illustrates an architecture of a wireless network in accordance with an example.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may be configured to connect, e.g., communicatively couple, with a radio access network (RAN) 1210—the RAN 1210 may be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.14 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 1201 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1210 is shown to be communicatively coupled to a core network (CN) 1220—via an S1 interface 1213. In embodiments, the CN 1220 may be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The CN 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the RAN 1210, and routes data packets between the RAN 1210 and the CN 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 may further be a node for policy enforcement and charging data collection. Policy and Charging Enforcement Function (PCRF) 1226 is the policy and charging control element of the CN 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
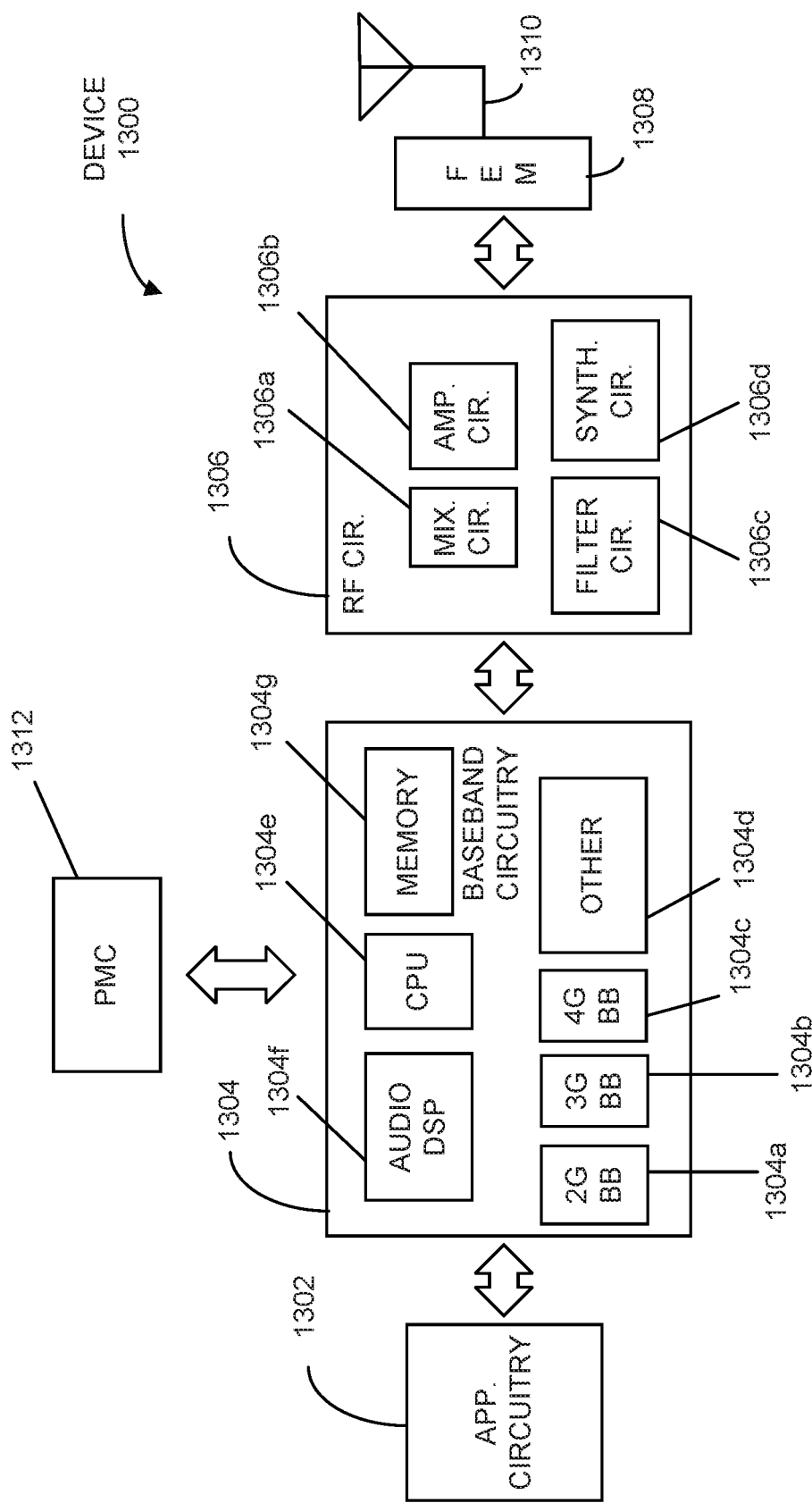
FIG. 13 illustrates a diagram of a wireless device (e.g., UE) in accordance with an example.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304a, a fourth generation (4G) baseband processor 1304b, a fifth generation (5G) baseband processor 1304c, or other baseband processor(s) 1304d for other existing generations, generations in development or to be developed in the future (e.g., second generation (2G), sixth generation (6G), etc.). The baseband circuitry 1304 (e.g., one or more of baseband processors 1304a-d) may handle various radio control functions that enable communication with one or more radio networks via the RF circuitry 1306. In other embodiments, some or all of the functionality of baseband processors 1304a-d may be included in modules stored in the memory 1304g and executed via a Central Processing Unit (CPU) 1304e. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals.

Output baseband signals may be provided to the baseband circuitry 1304 for further processing. In some embodiments, the output baseband signals may be zero-frequency baseband signals, although this is not a necessity. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a necessity. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
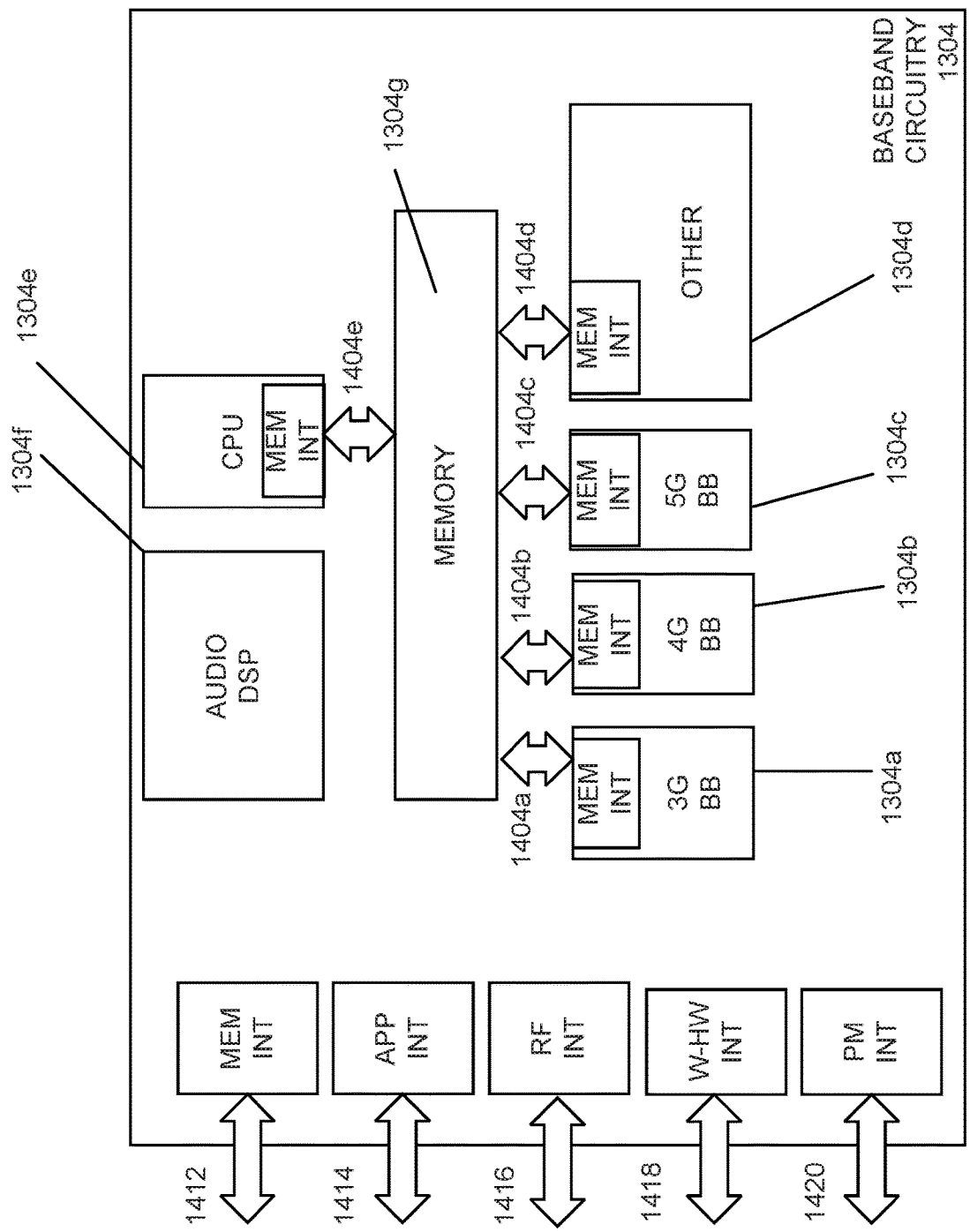
FIG. 14 illustrates interfaces of baseband circuitry in accordance with an example.

FIG. 14 illustrates example interfaces of baseband circuitry in accordance with some embodiments. As discussed above, the baseband circuitry 1304 of FIG. 13 may comprise processors 1304a-1304e and a memory 1304g utilized by said processors. Each of the processors 1304a-1304e may include a memory interface, 1404a-1404e, respectively, to send/receive data to/from the memory 1304g.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
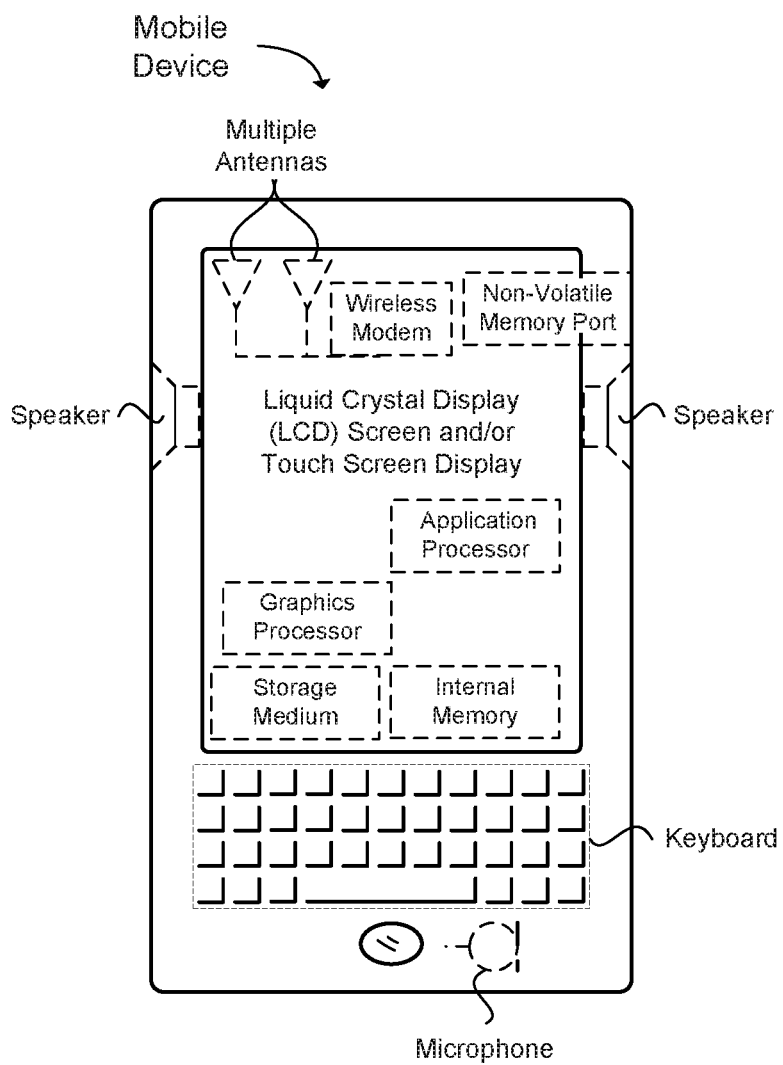
FIG. 15 illustrates a diagram of a wireless device (e.g., UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to encode downlink control information (DCI) for transmission to a user equipment (UE), the apparatus comprising: one or more processors configured to: identify, at the gNB, DCI for transmission from the gNB; determine, at the gNB, that a size of the DCI exceeds a defined threshold; divide, at the gNB, the DCI into one or more DCI segments, wherein each DCI segment includes header information to enable the one or more DCI segments to be assembled at the UE; and encode, at the gNB, the one or more DCI segments of the DCI for transmission from the gNB to the UE; and a memory interface configured to retrieve from a memory the DCI.

Example 2 includes the apparatus of Example 1, further comprising a transceiver configured to transmit the DCI segments to the UE.

Example 3 includes the apparatus of any of Examples 1 to 2, wherein each DCI segment is a fixed payload size.

Example 4 includes the apparatus of any of Examples 1 to 3, wherein the header information in a given DCI segment includes one or more of: a type field that indicates a DCI type; a subtype field that indicates a DCI subtype; or a segment identifier (ID) that indicates a unique ordering of the DCI segment.

Example 5 includes the apparatus of any of Examples 1 to 4, wherein the type field indicates that the DCI corresponds to a downlink unicast transmission, a downlink broadcast transmission or an uplink transmission.

Example 6 includes the apparatus of any of Examples 1 to 5, wherein the subtype field indicates that the DCI corresponds to one of: TxD rank 1, closed loop (CL) spatial multiplexing (SM) single code word (CW), open loop (OL) SM single CW, CL SM multi-CW, joint transmission (JT) coordinated multipoint (CoMP), network assisted interference cancellation and suppression (NAICS), CL SM wideband precoding matrix indicator (PMI) or CL SM subband PMI.

Example 7 includes the apparatus of any of Examples 1 to 6, wherein the one or more processors are further configured to insert a cyclic redundancy check (CRC) in a last DCI segment of the one or more DCI segments, wherein the CRC is utilized to check an integrity of the one or more DCI segments.

Example 8 includes the apparatus of any of Examples 1 to 7, wherein the one or more processors are further configured to insert a header parity check field in a given DCI segment for checking a parity of the header information in the given DCI segment.

Example 9 includes the apparatus of any of Examples 1 to 8, wherein the one or more processors are further configured to encode the DCI segments of the DCI for transmission in different control channel resources.

Example 10 includes an apparatus of a user equipment (UE) operable to decode downlink control information (DCI) received from a Next Generation NodeB (gNB), the apparatus comprising: one or more processors configured to: decode, at the UE, header information associated with one or more DCI segments received from the gNB; and combine, at the UE, the one or more DCI segments to form a DCI using the header information included in each of the DCI segments; and a memory interface configured to send to a memory the DCI.

Example 11 includes the apparatus of Example 10, further comprising a transceiver configured to receive the DCI segments from the gNB.

Example 12 includes the apparatus of any of Examples 10 to 11, wherein the one or more processors are further configured to: identify DCI segments received from the gNB that are associated with a same DCI type; and combine the DCI segments that are associated with the same DCI type to form the DCI.

Example 13 includes the apparatus of any of Examples 10 to 12, wherein the one or more processors are further configured to check an integrity of the one or more DCI segments using a cyclic redundancy check (CRC) included in a last DCI segment of the one or more DCI segments.

Example 14 includes the apparatus of any of Examples 10 to 13, wherein the one or more processors are further configured to perform a cyclic redundancy check (CRC) for each combination of DCI segments that are associated with a same DCI type to identify a correct DCI.

Example 15 includes the apparatus of any of Examples 10 to 14, wherein the one or more processors are further configured to check a parity of the header information in a given DCI segment using a header parity check field that is included in the given DCI segment.

Example 16 includes at least one machine readable storage medium having instructions embodied thereon for encoding downlink control information (DCI) for transmission from a Next Generation NodeB (gNB) to a user equipment (UE), the instructions when executed by one or more processors at the gNB perform the following: identifying, at the gNB, DCI for transmission from the gNB; determining, at the gNB, that a size of the DCI exceeds a defined threshold; dividing, at the gNB, the DCI into one or more DCI segments, wherein each DCI segment includes header information to enable the one or more DCI segments to be assembled at the UE; and encoding, at the gNB, the DCI segments of the DCI for transmission from the gNB to the UE.

Example 17 includes the at least one machine readable storage medium of Example 16, wherein each DCI segment is a fixed payload size.

Example 18 includes the at least one machine readable storage medium of any of Examples 16 to 17, wherein the header information in a given DCI segment includes one or more of: a type field that indicates a DCI type; a subtype field that indicates a DCI subtype; or a segment identifier (ID) that indicates a unique ordering of the DCI segment.

Example 19 includes the at least one machine readable storage medium of any of Examples 16 to 18, wherein the type field indicates that the DCI corresponds to a downlink unicast transmission, a downlink broadcast transmission or an uplink transmission.

Example 20 includes the at least one machine readable storage medium of any of Examples 16 to 19, wherein the subtype field indicates that the DCI corresponds to one of: TxD rank 1, closed loop (CL) spatial multiplexing (SM) single code word (CW), open loop (OL) SM single CW, CL SM multi-CW, joint transmission (JT) coordinated multipoint (CoMP), network assisted interference cancellation and suppression (NAICS), CL SM wideband precoding matrix indicator (PMI) or CL SM subband PMI.

Example 21 includes the at least one machine readable storage medium of any of Examples 16 to 20, further comprising instructions when executed perform the following: inserting a cyclic redundancy check (CRC) in a last DCI segment of the one or more DCI segments, wherein the CRC is utilized to check an integrity of the one or more DCI segments.

Example 22 includes the at least one machine readable storage medium of any of Examples 16 to 21, further comprising instructions when executed perform the following: inserting a header parity check field in a given DCI segment for checking a parity of the header information in the given DCI segment.

Example 23 includes the at least one machine readable storage medium of any of Examples 16 to 22, further comprising instructions when executed perform the following: encoding the DCI segments of the DCI for transmission in different control channel resources.

Example 24 includes a Next Generation NodeB (gNB) operable to encode downlink control information (DCI) for transmission to a user equipment (UE), the gNB comprising: means for identifying, at the gNB, DCI for transmission from the gNB; means for determining, at the gNB, that a size of the DCI exceeds a defined threshold; means for dividing, at the gNB, the DCI into one or more DCI segments, wherein each DCI segment includes header information to enable the one or more DCI segments to be assembled at the UE; and means for encoding, at the gNB, the DCI segments of the DCI for transmission from the gNB to the UE.

Example 25 includes the gNB of Example 24, wherein each DCI segment is a fixed payload size.

Example 26 includes the gNB of any of Examples 24 to 25, wherein the header information in a given DCI segment includes one or more of: a type field that indicates a DCI type; a subtype field that indicates a DCI subtype; or a segment identifier (ID) that indicates a unique ordering of the DCI segment.

Example 27 includes the gNB of any of Examples 24 to 26, wherein the type field indicates that the DCI corresponds to a downlink unicast transmission, a downlink broadcast transmission or an uplink transmission.

Example 28 includes the gNB of any of Examples 24 to 27, wherein the subtype field indicates that the DCI corresponds to one of: TxD rank 1, closed loop (CL) spatial multiplexing (SM) single code word (CW), open loop (OL) SM single CW, CL SM multi-CW, joint transmission (JT) coordinated multipoint (CoMP), network assisted interference cancellation and suppression (NAICS), CL SM wideband precoding matrix indicator (PMI) or CL SM subband PMI.

Example 29 includes the gNB of any of Examples 24 to 28, further comprising: means for inserting a cyclic redundancy check (CRC) in a last DCI segment of the one or more DCI segments, wherein the CRC is utilized to check an integrity of the one or more DCI segments.

Example 30 includes the gNB of any of Examples 24 to 29, further comprising: means for inserting a header parity check field in a given DCI segment for checking a parity of the header information in the given DCI segment.

Example 31 includes the gNB of any of Examples 24 to 30, further comprising: means for encoding the DCI segments of the DCI for transmission in different control channel resources.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like.

Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a base station operable to encode downlink control information (DCI) for transmission to a user equipment (UE), the apparatus comprising:
one or more processors configured to:
identify, at the base station, DCI for transmission from the base station;
determine, at the base station, that a size of the DCI exceeds a defined threshold;
divide, at the base station, the DCI into one or more DCI segments, wherein each DCI segment includes header information to enable the one or more DCI segments to be assembled at the UE, wherein the header information in a given DCI segment includes:
a type field that indicates a DCI type;
a subtype field that indicates a DCI subtype; and
a segment identifier (ID) that indicates a unique ordering of the DCI segment; and
encode, at the base station, the one or more DCI segments of the DCI for transmission from the base station to the UE; and
a memory interface configured to retrieve from a memory the DCI.

2. The apparatus of claim 1, further comprising a transceiver configured to transmit the DCI segments to the UE.

3. The apparatus of claim 1, wherein each DCI segment is a fixed payload size.

4. The apparatus of claim 1, wherein the type field indicates that the DCI corresponds to a downlink unicast transmission, a downlink broadcast transmission or an uplink transmission.

5. The apparatus of claim 1, wherein the subtype field indicates that the DCI corresponds to one of: TxD rank 1, closed loop (CL) spatial multiplexing (SM) single code word (CW), open loop (OL) SM single CW, CL SM multi-CW, joint transmission (JT) coordinated multipoint (CoMP), network assisted interference cancellation and suppression (NAICS), CL SM wideband precoding matrix indicator (PMI) or CL SM subband PMI.

6. The apparatus of claim 1, wherein the one or more processors are further configured to insert a cyclic redundancy check (CRC) in a last DCI segment of the one or more DCI segments, wherein the CRC is utilized to check an integrity of the one or more DCI segments.

7. The apparatus of claim 1, wherein the one or more processors are further configured to insert a header parity check field in a given DCI segment for checking a parity of the header information in the given DCI segment.

8. The apparatus of claim 1, wherein the one or more processors are further configured to encode the DCI segments of the DCI for transmission in different control channel resources.

9. An apparatus of a user equipment (UE) operable to decode downlink control information (DCI) received from a base station, the apparatus comprising:
one or more processors configured to:
decode, at the UE, header information associated with one or more DCI segments received from the base station; and
combine, at the UE, the one or more DCI segments to form a DCI using the header information included in each of the DCI segments, wherein the header information in a given DCI segment includes:
a type field that indicates a DCI type;
a subtype field that indicates a DCI subtype; and
a segment identifier (ID) that indicates a unique ordering of the DCI segment; and
a memory interface configured to send to a memory the DCI.

10. The apparatus of claim 9, further comprising a transceiver configured to receive the DCI segments from the base station.

11. The apparatus of claim 9, wherein the one or more processors are further configured to:
identify DCI segments received from the base station that are associated with a same DCI type; and
combine the DCI segments that are associated with the same DCI type to form the DCI.

12. The apparatus of claim 9, wherein the one or more processors are further configured to check an integrity of the one or more DCI segments using a cyclic redundancy check (CRC) included in a last DCI segment of the one or more DCI segments.

13. The apparatus of claim 9, wherein the one or more processors are further configured to perform a cyclic redundancy check (CRC) for each combination of DCI segments that are associated with a same DCI type to identify a correct DCI.

14. The apparatus of claim 9, wherein the one or more processors are further configured to check a parity of the header information in a given DCI segment using a header parity check field that is included in the given DCI segment.

15. At least one non-transitory machine readable storage medium having instructions embodied thereon for encoding downlink control information (DCI) for transmission from a base station to a user equipment (UE), the instructions when executed by one or more processors at the base station perform the following:
identifying, at the base station, DCI for transmission from the base station;
determining, at the base station, that a size of the DCI exceeds a defined threshold;
dividing, at the base station, the DCI into one or more DCI segments, wherein each DCI segment includes header information to enable the one or more DCI segments to be assembled at the UE, wherein the header information in a given DCI segment includes:
a type field that indicates a DCI type;
a subtype field that indicates a DCI subtype; and
a segment identifier (ID) that indicates a unique ordering of the DCI segment; and
encoding, at the base station, the DCI segments of the DCI for transmission from the base station to the UE.

16. The at least one non-transitory machine readable storage medium of claim 15, wherein each DCI segment is a fixed payload size.

17. The at least one non-transitory machine readable storage medium of claim 15, wherein the type field indicates that the DCI corresponds to a downlink unicast transmission, a downlink broadcast transmission or an uplink transmission.

18. The at least one non-transitory machine readable storage medium of claim 15, wherein the subtype field indicates that the DCI corresponds to one of: TxD rank 1, closed loop (CL) spatial multiplexing (SM) single code word (CW), open loop (OL) SM single CW, CL SM multi-CW, joint transmission (JT) coordinated multipoint (CoMP), network assisted interference cancellation and suppression (NAICS), CL SM wideband precoding matrix indicator (PMI) or CL SM subband PMI.

19. The at least one non-transitory machine readable storage medium of claim 15, further comprising instructions when executed perform the following: inserting a cyclic redundancy check (CRC) in a last DCI segment of the one or more DCI segments, wherein the CRC is utilized to check an integrity of the one or more DCI segments.

20. The at least one non-transitory machine readable storage medium of claim 15, further comprising instructions when executed perform the following: inserting a header parity check field in a given DCI segment for checking a parity of the header information in the given DCI segment.

21. The at least one non-transitory machine readable storage medium of claim 15, further comprising instructions when executed perform the following: encoding the DCI segments of the DCI for transmission in different control channel resources.

* * * * *